US008656800B2

(12) United States Patent
Cho et al.

(10) Patent No.: US 8,656,800 B2
(45) Date of Patent: Feb. 25, 2014

(54) HARMONIC DRIVE USING PROFILE SHIFTED GEAR

(75) Inventors: Chang-hyun Cho, Seoul (KR); Munsang Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 410 days.

(21) Appl. No.: 12/991,887

(22) PCT Filed: Jul. 3, 2008

(86) PCT No.: PCT/KR2008/003936
§ 371 (c)(1),
(2), (4) Date: Nov. 9, 2010

(87) PCT Pub. No.: WO2009/157607
PCT Pub. Date: Dec. 30, 2009

(65) Prior Publication Data
US 2011/0088496 A1    Apr. 21, 2011

(30) Foreign Application Priority Data
Jun. 24, 2008  (KR) .................. 10-2008-0059800

(51) Int. Cl.
*F16H 57/00* (2012.01)
(52) U.S. Cl.
USPC .................................. 74/411; 74/640; 74/86
(58) Field of Classification Search
USPC ........................ 74/411, 640, 86, 87
See application file for complete search history.

(56) References Cited

U.S. PATENT DOCUMENTS

| | | | | |
|---|---|---|---|---|
| 4,703,670 A | * | 11/1987 | Kondo | 74/640 |
| 5,417,186 A | * | 5/1995 | Elrod et al. | 123/90.17 |
| 5,485,766 A | * | 1/1996 | Ishikawa | 74/640 |
| 5,937,710 A | * | 8/1999 | Gould et al. | 74/640 |
| 6,167,783 B1 | * | 1/2001 | Ishikawa | 74/640 |
| 6,202,706 B1 | * | 3/2001 | Leban | 140/123.5 |
| 6,230,587 B1 | * | 5/2001 | Grill | 74/640 |
| 6,328,006 B1 | * | 12/2001 | Heer | 123/90.15 |

(Continued)

FOREIGN PATENT DOCUMENTS

| | | |
|---|---|---|
| KR | 10-2007-0070654 A | 7/2007 |
| KR | 10-0786205 B1 | 12/2007 |

(Continued)

OTHER PUBLICATIONS

PCT International Search Report and Written Opinion, PCT/KR2008/003936, Jan. 23, 2009, 6 Pages.

*Primary Examiner* — Troy Chambers
*Assistant Examiner* — Alexander Vu
(74) *Attorney, Agent, or Firm* — Fenwick & West LLP

(57) ABSTRACT

A harmonic drive according to the present invention comprises a plurality of internal gears; a band type of flexible gear provided with teeth engaged with each of the internal gears on its outer circumferential surface, the flexible gear having a pitch circumference length shorter than that of said internal gears; and a wave generating part disposed on an inner side of said flexible gear, the wave generating part generating a plurality of harmonic motions by deforming said flexible gear as the wave generating part rotates. Further, said flexible gear is formed integrally to engage with said plurality of internal gears so that the plurality of harmonic motions are overlapped, and one or more of said plurality of internal gears and said flexible gear are formed of profile shifted gears.

15 Claims, 9 Drawing Sheets

(56) References Cited

U.S. PATENT DOCUMENTS

| | | | |
|---|---|---|---|
| 6,459,940 B1 * | 10/2002 | Ghorbel et al. | 700/56 |
| 6,526,849 B1 * | 3/2003 | Ishikawa | 74/640 |
| 7,128,469 B2 * | 10/2006 | Kobayashi et al. | 384/447 |
| 8,028,603 B2 * | 10/2011 | Ishikawa | 74/640 |
| 2003/0075009 A1 * | 4/2003 | Ruttor | 74/640 |
| 2005/0014594 A1 * | 1/2005 | Degen et al. | 475/163 |
| 2005/0044986 A1 * | 3/2005 | Ishikawa | 74/640 |
| 2005/0066769 A1 * | 3/2005 | Kiyosawa | 74/640 |
| 2006/0283289 A1 * | 12/2006 | Baudendistel et al. | 74/640 |
| 2007/0022838 A1 * | 2/2007 | Ishikawa | 74/640 |
| 2007/0039414 A1 * | 2/2007 | Takemura | 74/640 |
| 2011/0088496 A1 * | 4/2011 | Cho et al. | 74/411 |

FOREIGN PATENT DOCUMENTS

| | | | |
|---|---|---|---|
| KR | 10-0800449 B1 | | 2/2008 |
| KR | 1020070024805 | * | 2/2008 |
| WO | WO 98/12097 A1 | | 3/1998 |
| WO | WO 98/21057 A1 | | 5/1998 |

* cited by examiner

700

HARMONIC DRIVE USING PROFILE SHIFTED GEAR

TECHNICAL FIELD

The present invention relates to a harmonic drive, more particularly to a harmonic drive which decelerates an actuator by using a flexible gear.

BACKGROUND ART

The harmonic drive generally comprises a cylindrically-shaped internal gear, a cup-shaped flexible gear and a wave generator. The wave generator is generally in the form of an ellipse and is disposed on an inner side of said flexible gear. The flexile gear provided with said wave generator is disposed on an inner circumferential surface of said internal gear. An inner circumferential surface of the internal gear and an outer circumferential surface of the flexible gear are generally configured so that the surfaces each has a tooth profile machined to have no slippage between them.

In the harmonic drive, when the internal gear is fixed and the wave generator is rotated, due to a difference of circumference lengths of the flexible gear and the internal gear, a slight rotation occurs in the flexible gear, which is called a harmonic motion. The one that utilizes such a harmonic motion is the harmonic drive.

In a cup-shaped flexible gear, the part corresponding to the inlet of the cup must be flexible in order to make the harmonic motion possible, and the part corresponding to the bottom of the cup must be hard in order to create an output of the flexible gear. That is to say, a single component needs to have different physical properties, which causes designing and manufacture thereof difficult. For example, there is a limitation in reducing the length of the cup, and, as a result, the size of the harmonic drive becomes large.

In order to solve such a problem, a harmonic drive with a band type of flexible gear was developed. A further internal gear further engaging with the flexible gear is needed to make the rotation of the flexible gear an effective output, in which case the further internal gear is designed to have the same number of teeth as those of the band type of flexible gear so that a relative rotating motion between the further internal gear and the band type of flexible gear does not occur.

However, the band type of flexible gear is deformed by the wave generator which is in the form of an ellipse, whereby a relative radial motion between the further internal gear and the band type of flexible gear occurs. Namely, the relative radial motion occurs by the difference between a major axis and a minor axis of the ellipse-shaped wave generator. Such relative radial motion results in a backlash problem.

Among harmonic drives having a band type of flexible gear applied therein there is a harmonic drive utilizing a double harmonic motion, which is however in need of a set of gear teeth having a plurality of different pitch diameters in the flexible gear, thereby causing lots of manufacturing problems.

DISCLOSURE OF INVENTION

Technical Problem

Therefore, the present invention has been made in view of the above problems, and it is an object of the present invention to provide an easy manufacture as well as to provide an improved efficiency of teeth engagement so that a power transmission characteristic is improved, and to provide a harmonic drive which can overlap two harmonic motions into a double harmonic motion.

Technical Solution

In accordance with an aspect of the present invention, the above and other objects can be accomplished by the provision of a harmonic drive using profile shifted gears, comprising a plurality of internal gears; a band type of flexible gear provided with teeth engaged with each of the internal gears on its outer circumferential surface, the flexible gear having a pitch circumference length shorter than that of said internal gears; and a wave generating part disposed on an inner side of said flexible gear, the wave generating part generating a plurality of harmonic motions by deforming said flexible gear as the wave generating part rotates, wherein said flexible gear is formed integrally to engage with said plurality of internal gears so that the plurality of harmonic motions are overlapped, and one or more of said plurality of internal gears and said flexible gear are formed of profile shifted gears.

In accordance with another aspect of the present invention, there is provided the harmonic drive using profile shifted gears, wherein one or more of said plurality of internal gears are formed of profile shifted gears having profile shifted teeth, and said flexible gear is a standard gear having single standard teeth which engage with said plurality of internal gears.

In accordance with a further aspect of the present invention, there is provided the harmonic drive using profile shifted gears, wherein said plurality of internal gears are formed of standard gears having standard teeth of the same pitch diameters respectively, and said flexible gear has one or more profile shifted teeth engaging with the standard teeth of the individual internal gears.

In accordance with a still further aspect of the present invention, there is provided the harmonic drive using profile shifted gears, wherein the teeth of said plurality of internal gears and the teeth of said flexible gear are all formed of profile shifted teeth.

In accordance with a still further aspect of the present invention, there is provided a harmonic drive using profile shifted gears comprising a plurality of external gears arranged coaxially and in parallel to one another; a band type of flexible gear having on its inner circumferential surface teeth which engage with said plurality of the external gears respectively, said flexible gear having a pitch circumference length longer than that of said external gear; and a wave generating part enabling said external gears and said flexible gear to engage with one another, as the wave generating part partially presses an outer circumferential surface of said flexible gear and rotates, and one or more of said plurality of external gears and said flexible gear are formed of profile shifted gears.

In accordance with a still further aspect of the present invention, there is provided the harmonic drive using profile shifted gears, wherein one or more of said plurality of external gears are formed of profile shifted gears having profile shifted teeth, and said flexible gear is a standard gear having single standard teeth which engage with said plurality of external gears.

In accordance with a still further aspect of the present invention, there is provided the harmonic drive using profile shifted gears, wherein said plurality of external gears are standard gears each having standard teeth of the same pitch diameters, and said flexible gear has one or more profile shifted teeth which engage with the standard teeth of said individual external gears.

In accordance with a still further aspect of the present invention, there is provided the harmonic drive using profile shifted gears, wherein the teeth of said plurality of external gears and the teeth of said flexible gear are all formed of profile shifted teeth.

In accordance with a still further aspect of the present invention, there is provided the harmonic drive using profile shifted gears, wherein said wave generating part comprises a plurality of needle rollers rolling on the outer circumferential surface of said flexible gear and rotating; connecting sprockets disposed on both sides of said external gears, the connecting sprockets connected to said needle rollers; and weight balances for balanced rotation arranged at opposite sides of said needle rollers.

In accordance with a still further aspect of the present invention, there is provided the harmonic drive using profile shifted gears, wherein said wave generating part comprises a plurality of balls rolling on the outer circumferential surface of said flexible gear and rotating; a housing part having on its inner circumferential surface a groove in which said balls are restrained; connecting sprockets disposed on both sides of said external gears, the connecting sprockets connected to said housing part; and weight balances for balanced rotation arranged at opposite sides of said housing part.

In accordance with a still further aspect of the present invention, there is provided the harmonic drive using profile shifted gears, wherein said wave generating part comprises a surface contacting part pressing the outer circumferential surface of said flexible gear and sliding; connecting sprockets disposed on both sides of said external gears, the connecting sprockets connected to said surface contacting part; and weight balances for balanced rotation arranged at opposite sides of said surface contacting part.

In accordance with a still further aspect of the present invention, there is provided a harmonic drive using profile shifted gears, comprising a plurality of external gears arranged coaxially and in parallel to one another; a band type of flexible gear having on its inner circumferential surface teeth which engage with said plurality of the external gears respectively, said flexible gear having a pitch circumference length longer than that of said external gear; and a wave generating part enabling said external gears and said flexible gear to engage with one another, as the wave generating part is disposed on the inner side of the flexible gear, is spaced apart from said external gears and rotates, and one or more of said plurality of external gears and said flexible gear are formed of profile shifted gears.

Advantageous Effects

According to a double harmonic drive of the invention, since a thickness of a flexible gear can be minimized by using profile shifted gears, energy loss generated when the flexible gear is deformed is minimized so that power transmitting efficiency can be improved.

Further, a harmonic drive according to the invention can improve the engagement of teeth between a band type of a flexible gear and external gears to have an improved power transmitting characteristic so that a high torque can be transmitted. Further, since two harmonic motions are overlapped with each other into a double harmonic motion, a variety of velocity reduction rate can be obtained, and backlash can be removed.

Furthermore, a harmonic drive according to the invention enables to manufacture a flexible gear, external gears and connecting sprockets by means of a molding method, whereby manufacturing costs can be reduced in mass production.

BEST MODE FOR CARRYING OUT THE INVENTION

Hereinafter, harmonic drives according to embodiments of the present invention will be described in more detail with reference to accompanying drawings.

Figure 1:
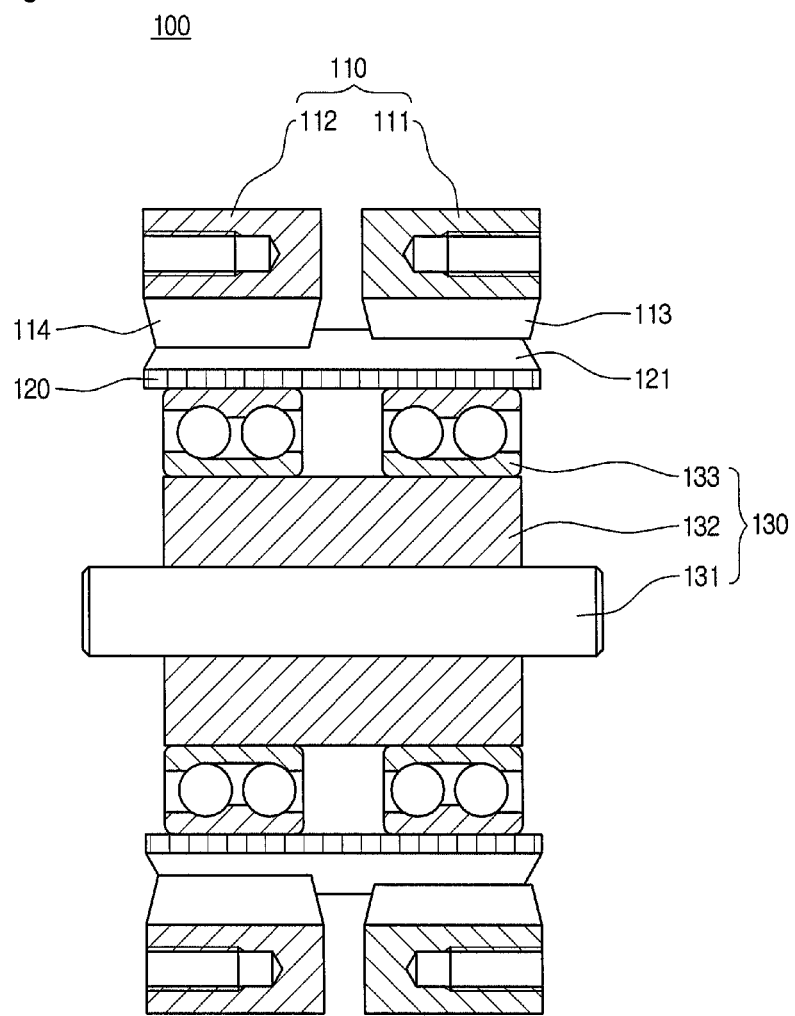
FIG. 1 is a cross-sectional view of a harmonic drive according to a first embodiment of the present invention.
Figure 2:
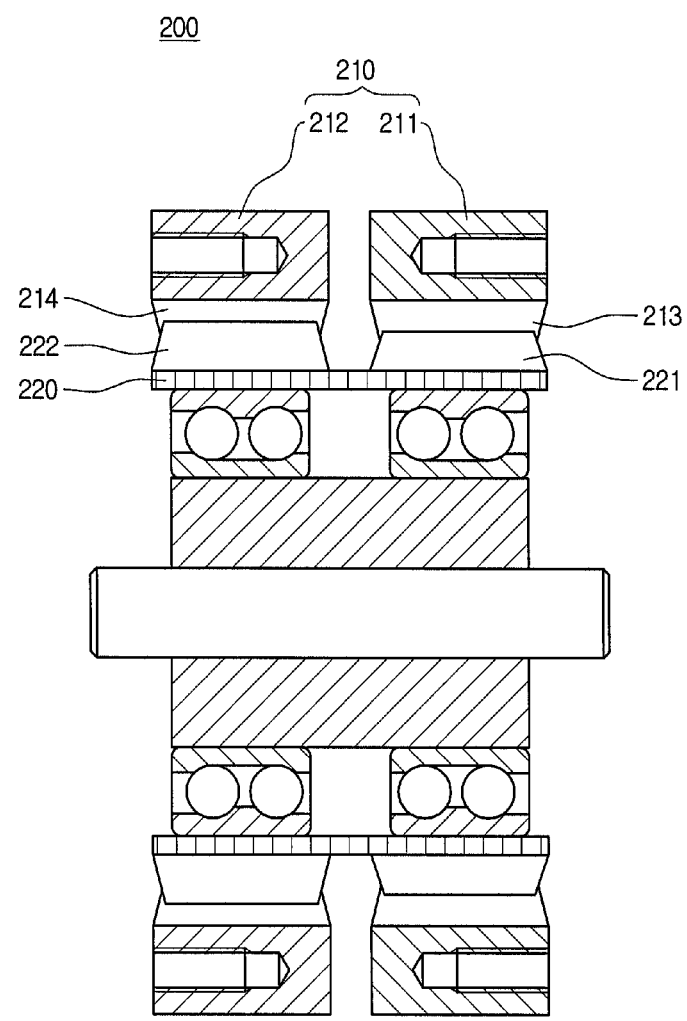
FIG. 2 is a cross-sectional view of a harmonic drive according to a second embodiment of the invention.

FIG. 1 is a cross-sectional view of a harmonic drive according to a first embodiment of the present invention, and FIG. 2 is a cross-sectional view of a harmonic drive according to a second embodiment of the invention.

Referring to FIG. 1, a harmonic drive 100 according to a first embodiment of the invention comprises a plurality of a cylindrically-shaped internal gear 110, a flexible gear 120 and a wave generating part 130.

The internal gear 110 comprises a first internal gear 111 and a second internal gear 112, on inner circumferential surfaces of which first internal teeth 113 and second internal teeth 114 are formed, respectively. Here, the first internal teeth 113 are formed of profile shifted teeth, and the second internal teeth 114 are formed of standard teeth. Therefore, if the first internal gear 111 and the second internal gear 112 are formed of the same module, they have the same pitch diameters but different number of teeth. Assuming that the first internal gear 111 and the second internal gear 112 formed of standard teeth profiles have 100 teeth and 102 teeth respectively, in order that the first internal gear 111 and the second internal gear 112 are formed of the same module, the first internal gear 111 and the second internal gear 112 should have different pitch circle diameters. However, according to an embodiment of the invention, when one of the internal gears is shifted in its teeth profile in accordance with the difference of a pitch circle radius between them, the individual internal gears have the same pitch circle diameters, with the number of teeth in case of the standard teeth profiles maintained without change.

The flexible gear 120 has on its outer circumferential surface integrally formed single external teeth 121 which engage with the first internal teeth 113 and the second internal teeth 114. Here, the external teeth 121 are formed of standard teeth. A pitch circumference length of the flexible gear 120 is shorter than that of the internal gear 110.

Further, the flexible gear 120 is, for example, in the form of a band, which may be made of materials having elasticity such as rubber, synthetic rubber, alloy, and plastics. Accordingly, the flexible gear 120 is deformed as a wave generating part 130 which will be described later rotates, as a result of which the flexible gear is rotated.

The wave generating part 130 is composed of an ellipse-shaped cam 132 fixed to an input shaft 131 and a bearing part 133 disposed on an outer circumferential surface of the cam 132. As shown, the bearing part 133 may be formed of a separated pair, but they may be formed integrally.

The harmonic drive 100 having such a configuration overlaps a plurality of harmonic motions. Referring to operations of the harmonic drive 100, when the first internal gear 111 is fixed and the input shaft 131 is rotated, the whole wave generating part 130 rotates. Rotation of the wave generating part 130 causes the harmonic drive 100 according to a first embodiment of the invention to overlap the first harmonic motion and the second harmonic motion, thereby finally creating an output to the second internal gear 112.

Firstly, the first harmonic motion is generated by the first internal gear 111, the external teeth 121 of the flexible gear 120 and the wave generating part 130. It is assumed that the first internal gear 111 is fixed. When the wave generating part is rotated, the flexible gear 120 is deformed so that the first internal gear 111 and the external teeth 121 interact with each other, as a result of which the flexible gear 120 rotates in the direction opposite to the rotating direction of the wave generating part 130, thereby generating the first harmonic motion.

Next, the second harmonic motion is generated by the second internal gear 112, the external teeth 121 of the flexible gear 120 and the wave generating part 130. Here, it is assumed that the flexible gear 120 is fixed. When the wave generating part 130 is rotated, the flexible gear 120 is deformed so that the second internal gear 112 and the external teeth 121 interact with each other, as a result of which the second internal gear 112 rotates in the same direction as the rotating direction of the wave generating part 130, thereby generating the second harmonic motion.

The first harmonic motion and the second harmonic motion are overlapped with each other since the flexible gear 120 is formed integrally, thereby finally generating an output to the second internal gear 112.

Through such operations, the harmonic drive 100 according to the first embodiment of the invention generates a harmonic motion once more, thereby improving teeth engaging efficiency and reducing a backlash in comparison with a harmonic drive configured to solely aim at power transmission. The invention can generate the stable output by using the feature of the harmonic drive.

Further, in the harmonic drive 100 according to the first embodiment of the invention, profile shifted teeth are formed on one or more of the plurality of the internal gears so that the plurality of the internal gears have the same pitch diameters but different number of teeth. As a result, the harmonic drive 100 according to the first embodiment of the invention is provided with a flexible gear having a single pitch diameter to minimize the thickness of the flexible gear so that an energy loss generated when the flexible gear is deformed is minimized and thus an efficiency of the drive is increased.

Furthermore, because a set of double gear teeth used in a conventional double harmonic drive is removed, an easy manufacturing is enabled.

In the above description, it has been described that the output is transmitted to the second internal gear 112. However, the output may be transmitted to the first internal gear 111 or the flexible gear 120 as in the conventional harmonic drive. Further, in the above description it has been described that there are two internal gears. However, the number of internal gears can be increased.

Referring to FIG. 2, in a harmonic drive 200 according to a second embodiment of the invention, in order to provide different number of teeth, first and second internal gears 211, 212 are formed of standard gears, and a flexible gear 220 is formed of profile shifted gears. That is to say, first and second internal teeth 213, 214 of the first and second internal gears 211, 212 are formed of the same number of standard teeth, whereas, in case of the flexible gear 220, first external teeth 221 which engage with the first internal teeth 213 are formed of profile shifted teeth, and second external teeth 222 which engage with the second internal teeth 214 is formed of standard teeth.

In other words, the harmonic drive 200 according to the second embodiment of the invention is configured such that the internal gears have the same number of teeth and the flexible gear has a difference in the number of teeth between the first external teeth and the second external teeth instead of having a difference in the number of teeth between the internal gears as in the first embodiment. It is also possible for the harmonic drive 200 according to the second embodiment of the invention to realize a plurality of harmonic motions, as in the first embodiment.

Further, although not shown in the drawings, the first and second internal teeth 213, 214 of the first and second internal gear 211, 212 and the first and second external teeth 221, 222 of the flexible gear 220 may be all formed of profile shifted teeth. For example, the first internal teeth 213 of the first internal gear 211 and the first external teeth 221 of the flexible gear 220 are formed by a positive (+) profile shift, and the second internal teeth 214 of the second internal gear 212 and the second external teeth 222 of the flexible gear 220 are formed by a negative (−) profile shift, so that the same pitch circle diameters but different number of teeth can be realized.

To summarize, according to the present invention, one or more of the plurality of the internal gears and the flexible gear are formed of profile shifted gears to have different number of teeth between them so that a plurality of harmonic motions can be overlapped.

Next, a description will be given with respect to another type of a harmonic drive utilizing profile shifted gears.

Figure 3:
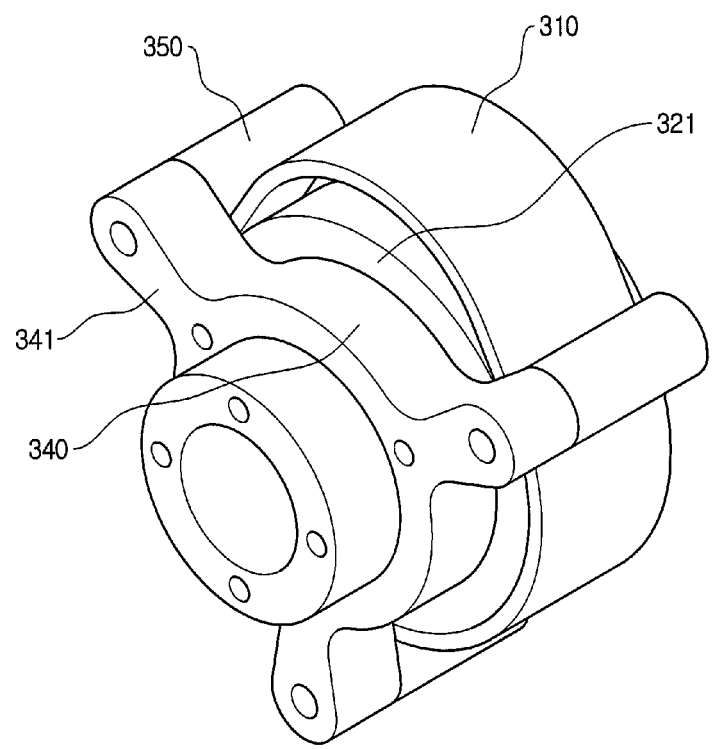
FIG. 3 is a perspective view of a harmonic drive according to a third embodiment of the invention.
Figure 4:
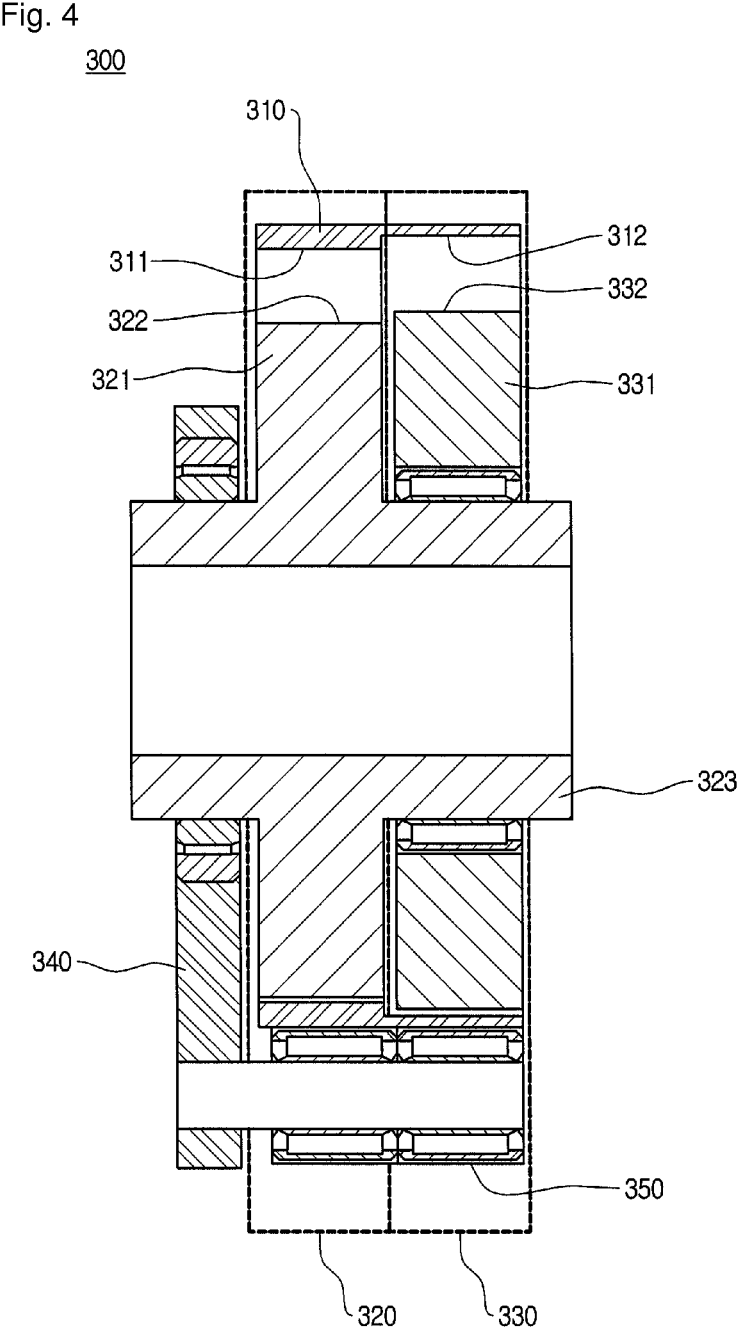
FIG. 4 is a cross-sectional view of the harmonic drive shown in FIG. 3.

FIG. 3 is a perspective view of a harmonic drive according to a third embodiment of the invention, and FIG. 4 is a cross-sectional view of the harmonic drive shown in FIG. 3.

Referring to FIGS. 3 and 4, a harmonic drive according to the third embodiment of the invention comprises a first external gear 321 and a second external gear 331 which are disposed parallel coaxially. From both sides of the center of the first external gear 321, a rotating shaft 323 is extended outwardly, and a second external gear 331 is disposed on a side of the rotating shaft 323.

Further, on an outer side of the first and second external gears 321, 331 a circular band type of flexible gear 310 is arranged. The flexible gear 310 is provided, on its inner circumferential surface, with first and second internal teeth 311, 312 which engage with first and second external teeth 322, 332 of the first and second gear 321, 331, respectively. Furthermore, a pitch circumference length of the flexible gear 310 is longer than that of the first and second external gears 321, 331.

As in the first and second embodiments, in the harmonic drive 300 according to the third embodiment of the invention, one or more of the first and second external gears 321, 331 and the flexible gear 310 are formed of profile shifted gears in order to have different number of teeth between them. For example, the first and second internal teeth 311, 312 of the flexible gear 310 may be formed of the same number of standard teeth, the first external teeth 322 of the first external gear 321 formed of profile shifted teeth, and the second external teeth 332 of the second external gear 331 formed of standard teeth.

On an outer side of the flexible gear 310 is arranged a plurality of rollers 350. As the rollers 350 roll on the outer circumferential surface of the flexible gear 310, an engagement between the flexible gear 310 and the first and second external gears 321, 331 is maintained. The rollers 350 each is connected to a connecting sprocket 340, so that they are spaced apart at an equal distance, thereby rotating.

The connecting sprocket 340 is disposed on the rotating shaft 323 of the first external gear 321, and from an outer circumferential surface of the sprocket, connecting bars 341 are extended outwardly, the number of which corresponding to the number of the rollers 350. The rollers 350 are disposed on the individual connecting bars 341 to rotate.

Accordingly, when the connecting sprocket 340 is rotated, the rollers 350 connected to the connecting sprocket 340 is disposed on the connecting bars 341 to rotate and at the same time to revolve about the first and second external gears 321, 331 with the flexible gear 310 interposed among the rollers. As such, the rollers 350 and the connecting sprocket 340 function as a wave generator of the harmonic drive 300.

Further, preferably, the plurality of the rollers 350 are arranged symmetrically about the center of rotation of the connecting sprocket 340 to keep a balance during rotation.

In the harmonic drive having such a configuration, it can be seen that the first harmonic drive 320 and the second harmonic drive 330 share the connecting sprocket 340 and the flexible gear 310.

More specifically, the first harmonic drive 320 comprises the first external gear 321, the rollers 350, the connecting sprocket 340 and the flexible gear 310 having the first internal teeth 311. Further, the second harmonic drive 330 comprises the second external gear 331, the rollers 350, the connecting sprocket 340 and the flexible gear 310 having the second internal teeth 312.

Accordingly, the harmonic drive 300 according to the third embodiment of the invention can generate a double harmonic motion into which a first harmonic motion by means of the first harmonic drive 320 and a second harmonic motion by means of the second harmonic drive 330 are overlapped with each other.

Firstly, a description is given with respect to the first harmonic motion by means of the first harmonic drive 320. It is assumed that the first harmonic drive is separated from the second harmonic drive. When the first external gear 321 is fixed and the connecting sprocket 340 is rotated in one direction, the flexible gear 310 is rotated in the rotating direction of the connecting sprocket 340 by a difference of pitch circumference lengths between the first external gear 321 and the flexible gear 310.

Next, a description is given with respect to the second harmonic motion by means of the second harmonic drive 330. It is also assumed that the second harmonic drive is separated from the first harmonic drive. When the second external gear 331 is fixed and the connecting sprocket 340 is rotated in one direction, the flexible gear 310 is rotated in the rotating direction of the connecting sprocket by a difference in the number of teeth between the external teeth of the second external gear 331 and the internal teeth 312 of the flexible gear 310.

Here, the first external gear 321 and the second external gear 331 have the same pitch diameters but different number of teeth by using profile shifted gears, and therefore the first harmonic motion and the second harmonic motion which is generated by the rotation of the connecting sprocket 340 differs from each other. Further, the first harmonic drive 320 and the second harmonic drive 330 are not separated from each other, as in the above assumption, but connected to each other to receive the same input via the connecting sprocket 340, whereby the first harmonic motion and the second harmonic motion are overlapped. As a result, the harmonic drive 300 according to the third embodiment of the invention generates a double harmonic motion by a difference between the first harmonic motion and the second harmonic motion.

For example, in the harmonic drive 300 according to the third embodiment of the invention, when the first external gear 321 is fixed and the connecting sprocket 340 is rotated, the freely rotatable second external gear 331 rotates by a difference between the first harmonic motion of the first harmonic drive 320 and the second harmonic motion of the second harmonic drive 330. When the second external gear 331 is used as an output, a reduction in velocity is attained due to the double harmonic motion.

In the harmonic drive 300 according to the embodiment of the invention, the number of engaged teeth between the flexible gear 310 and the first and second external gears 321, 331 is increased as compared to a conventional harmonic drive.

The harmonic drive according to the third embodiment of the invention has two harmonic drives 320, 330 combined with each other. However, the present invention is not limited to this and may be configured such that three or more harmonic drives are combined with one another.

Further, the harmonic drive according to the embodiment is provided with the connecting sprocket 340 on one side. However, the invention is not limited to this and the drive may be provided with the sprocket on both sides.

Figure 5:
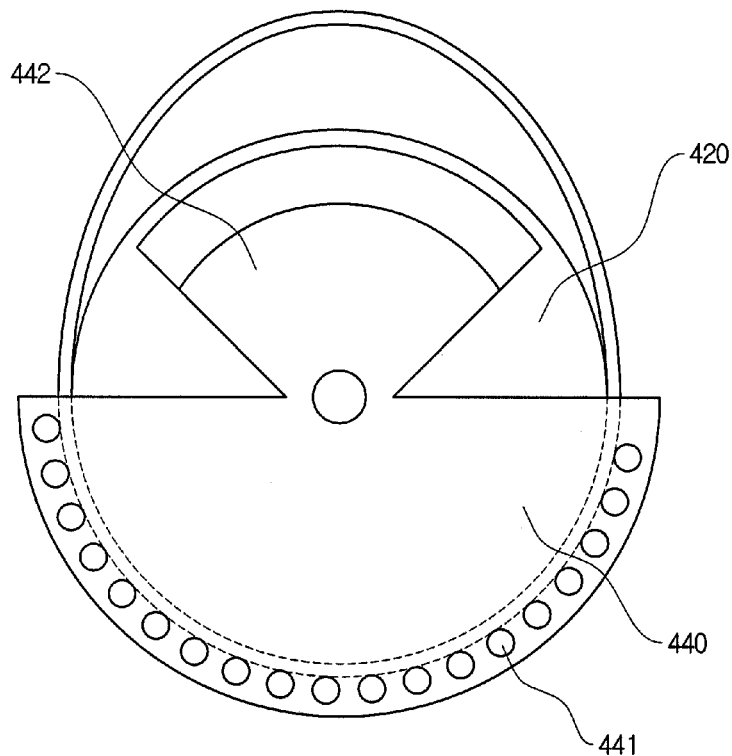
FIG. 5 is a lateral view of a harmonic drive according to a fourth embodiment of the invention.
Figure 6:
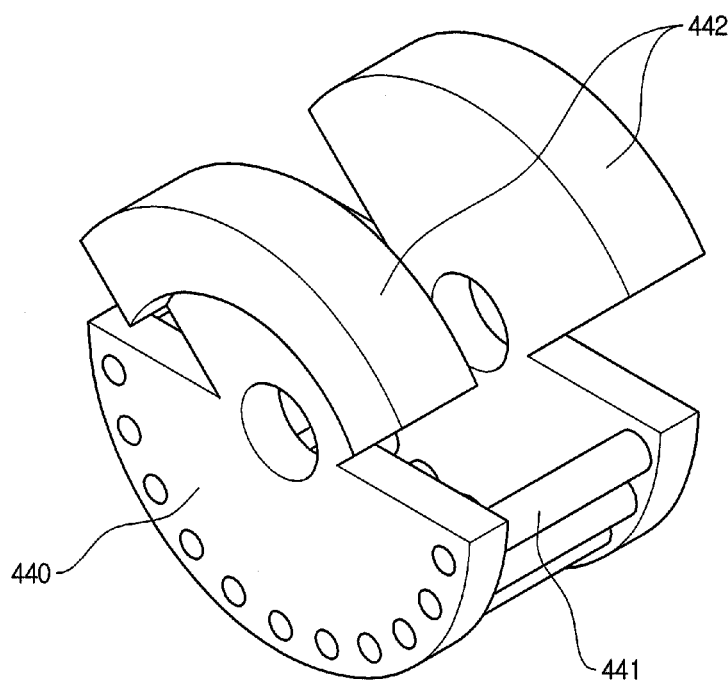
FIG. 6 is a perspective view of a wave generating part of the harmonic drive shown in FIG. 5.

FIG. 5 is a lateral view of a harmonic drive according to a fourth embodiment of the invention, and FIG. 6 is a perspective view of a wave generating part of the harmonic drive shown in FIG. 5.

Referring to FIGS. 5 and 6, the harmonic drive 400 according to the fourth embodiment of the invention has a wave generating part which is different in type from that of the harmonic drive 300 according to the third embodiment. Namely, the harmonic drive 400 according to the fourth embodiment of the invention comprises a pair of connecting sprockets 440 disposed on both sides of the external gear 420 and a plurality of needle rollers 441 disposed between the connecting sprockets 440. The connecting sprocket 440 can be semicircular, whereby the needle rollers 441 are arranged at a predetermined interval along a circumference of the connecting sprocket 440.

Further, the harmonic drive 400 according to the fourth embodiment of the invention comprises a weight balance 442 for a balanced rotation at an opposite side of the needle rollers 441 in order to adjust an imbalanced rotation generated by the connecting sprocket having an asymmetrical configuration.

Figure 7:
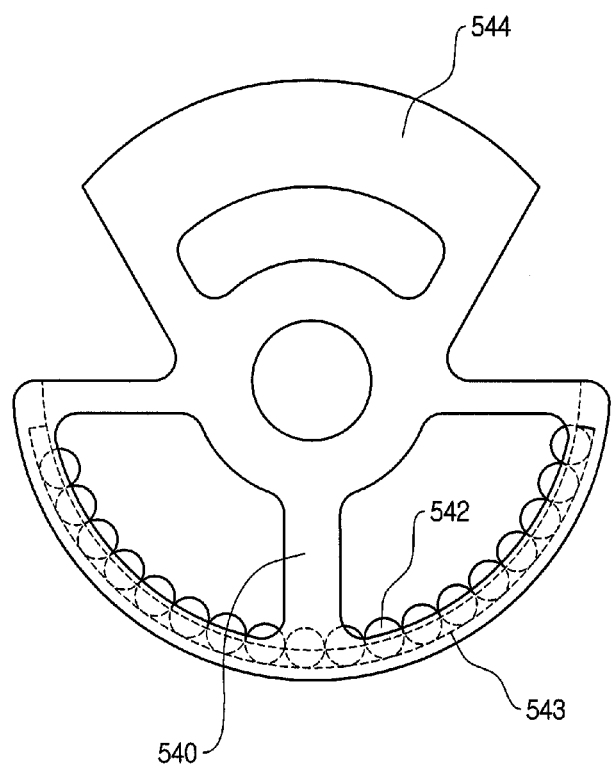
FIG. 7 is a lateral view of a wave generating part of a harmonic drive according to a fifth embodiment of the invention.
Figure 8:
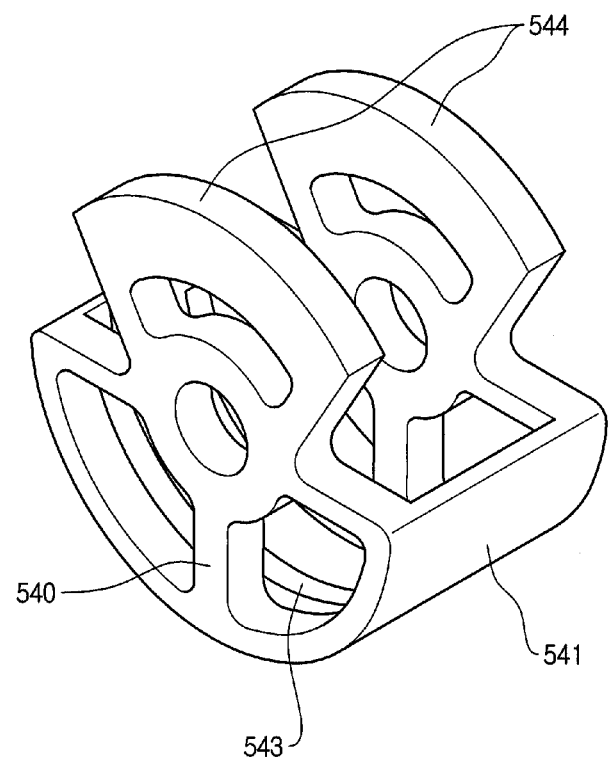
FIG. 8 is a perspective view of the wave generating part of the harmonic drive shown in FIG. 7.

FIG. 7 is a lateral view of a wave generating part of a harmonic drive according to a fifth embodiment of the invention, and FIG. 8 is a perspective view of the wave generating part of the harmonic drive shown in FIG. 7.

Referring to FIGS. 7 and 8, the harmonic drive according to the fifth embodiment of the invention comprises a housing part 541 between a pair of semicircular connecting sprockets 540. On an inner side of the housing part 541 are disposed balls 542 which enable the external gear to be engaged with the flexible gear. The balls 542 are arranged in a groove 543 formed on the inner side of the housing part 541, and the distance between the balls is maintained by a retainer.

Also in this embodiment, for a balanced rotation, at an opposite side of the housing part 541 is formed an arc shaped weight balance 544.

In the fifth embodiment, the balls 542 are disposed in an inner surface of the housing part 541. However in another embodiment, the balls may not to be disposed therein for a surface contact between an outer surface of the flexible gear and the wave generating part. In this case, in order to reduce a frictional force, a lubricant can be applied between the flexible gear and the wave generating part.

Figure 9:
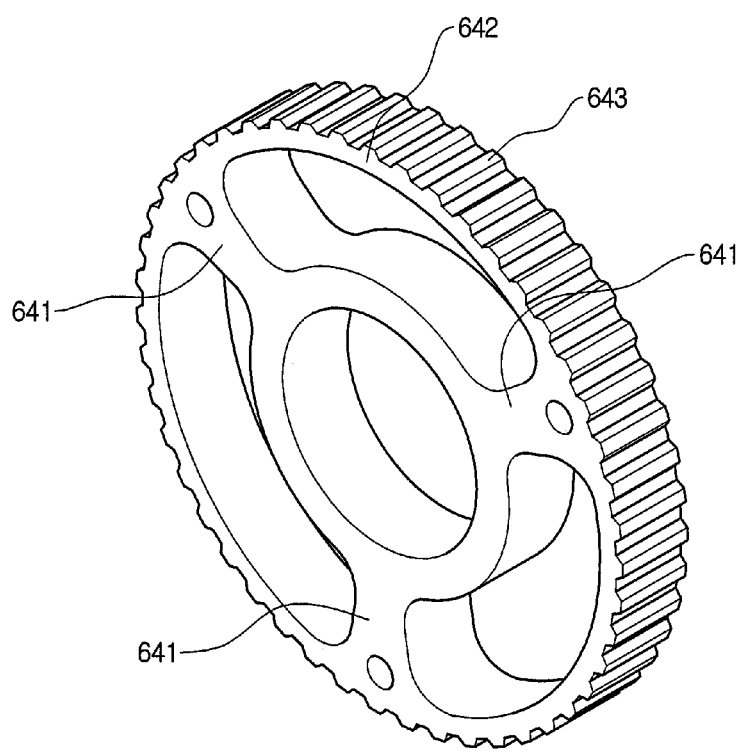
FIG. 9 is a perspective view showing a connecting sprocket of a harmonic drive according to a sixth embodiment of the invention.

FIG. 9 is a perspective view showing a connecting sprocket of a harmonic drive according to a sixth embodiment of the invention.

Referring to FIG. 9, the harmonic drive according to the sixth embodiment of the invention comprises a connecting sprocket 640 having a power transmitting part 642 which connects individual ends of connecting bars 641 with one another. On an outer circumferential surface of the power transmitting part 642 are formed teeth 643 for transmitting power. Accordingly, it is possible for the connecting sprocket 640 to induce a first velocity reduction. In FIG. 9, teeth are formed on an outer circumferential surface of the power transmitting part. However, the present invention is not limited to this and the profile teeth may be formed also on an inner circumferential surface of the power transmitting part.

Figure 10:
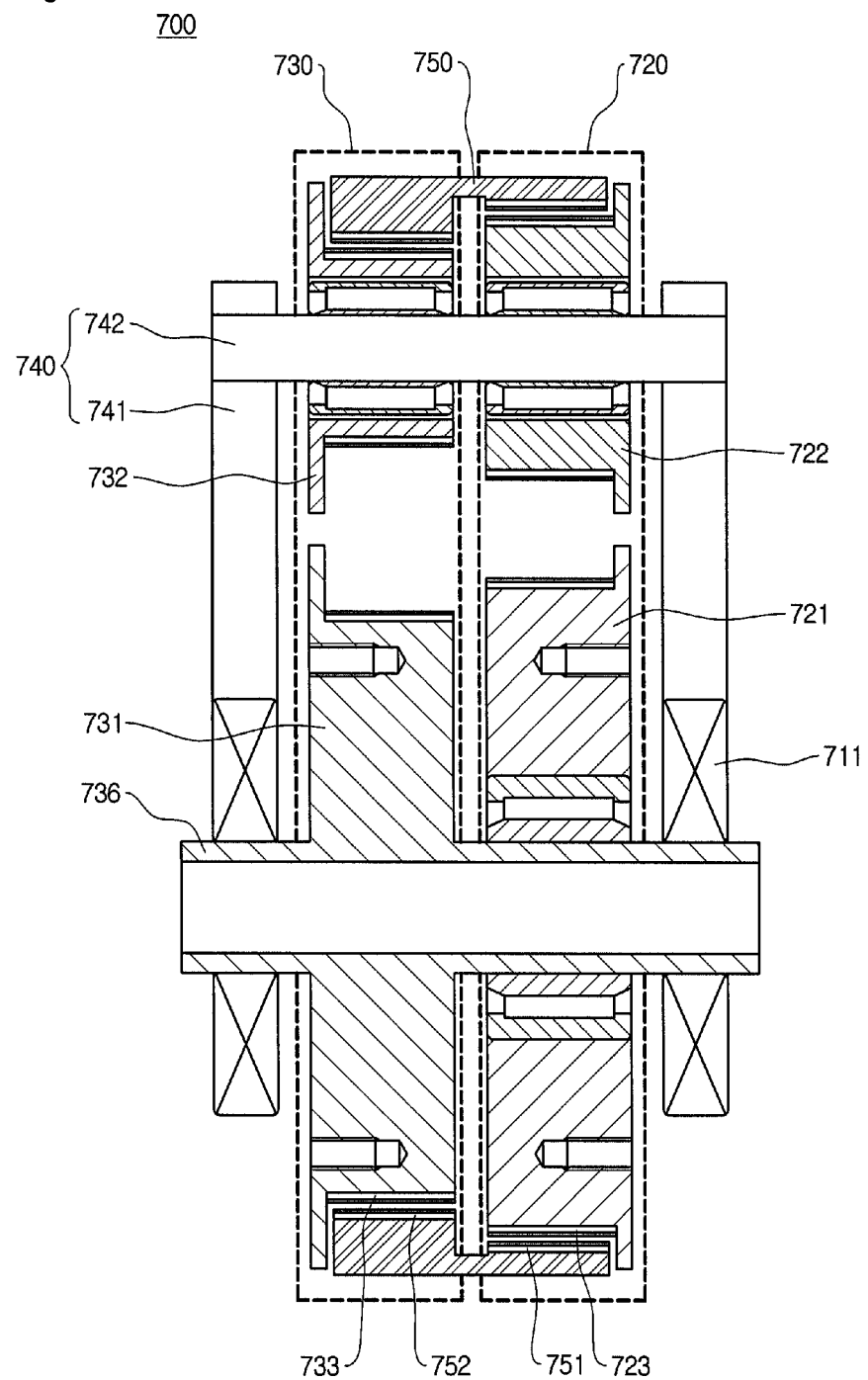
FIG. 10 is a cross-sectional view of a harmonic drive according to a seventh embodiment of the invention.
Figure 11:
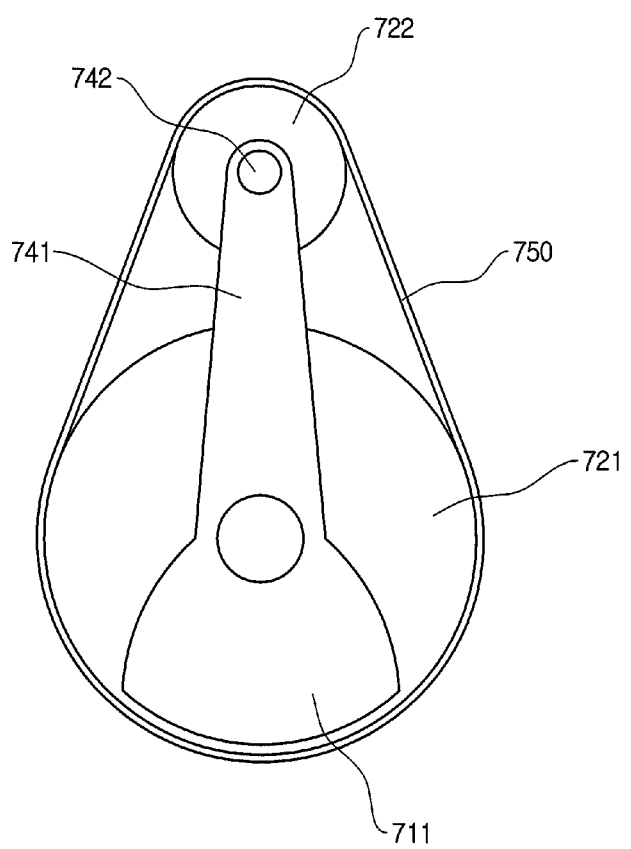
FIG. 11 is a lateral view of the harmonic drive shown in FIG. 10.

FIG. 10 is a cross-sectional view of a harmonic drive according to a seventh embodiment of the invention, and FIG. 11 is a lateral view of the harmonic drive shown in FIG. 10.

Referring to FIGS. 10 and 11, a harmonic drive 700 according to the seventh embodiment of the invention comprises a first and second external gears 721, 731 which are arranged coaxially and a first and second wave gears 722, 732 which are spaced apart from the first and second external gears 721, 731 by a predetermined interval. The first and second wave gears 722, 732 are also arranged coaxially.

The first and second external gears 721, 731 and the first and second wave gear 722, 732 are connected to each other by connecting sprockets 740. The connecting sprockets 740 comprise connecting bars 741 which are rotatably disposed on a rotating center shaft 736 of the first and second external gears 721, 731, and a connecting shaft 742 which penetrates through centers of the first and second wave gears 722, 732 to be connected to an end of the connecting bars 741. The connecting bars 741 are arranged on outer sides of the first and second external gears 721, 731 respectively and consist of a pair. The first and second wave gears 722, 732 are supported by the connecting shaft 742 via bearings to rotate about the connecting shaft 742.

Further, the connecting sprockets 740 each is provided, on the other side of the connecting bar 741, with a weight balance 711 for a balanced rotation.

Accordingly, when the connecting bars 741 of the connecting sprockets 740 are rotated about the rotating center shaft 736, the first and second wave gears 722, 732 are rotated simultaneously by the connecting shaft 742. That is to say, the connecting sprockets 740 and the first and second wave gears 722, 732 function as a wave generating part.

The first and second external gears 721, 731 and the first and second wave gears 722, 732 are all disposed on an inner side of the flexible gear 750 in the form of a band. The flexible gear 750 is provided, on its inner circumferential surface, with first and second internal teeth 751, 752, respectively, corresponding to first and second external teeth 723, 733 of the first and second external gears 721, 731.

As in the above embodiments, in the harmonic drive 700 according to the seventh embodiment of the invention, in order to have the same pitch diameters but different number of teeth, one or more of the first and second external gears 721, 731 and the flexible gear 750 may be profile shifted gears.

Further, the first and second wave gears 722, 732 have external teeth corresponding to the internal teeth 751, 752 of the flexible gear 750.

As a result, the first and second external gears 721, 731 and the first and second wave gears 722, 732 each firmly engages with the flexible gear 750 to rotate.

In the harmonic drive 700 having such a configuration, it can be seen that the first harmonic drive 720 and the second harmonic drive 730 share the connecting sprocket 740 and the flexible gear 750.

Namely, it can be seen that the first harmonic drive 720 comprises the first external gear 721, the first wave gear 722, the connecting sprocket 740 and the flexible gear 750 having the first internal teeth 751. Further, it can be seen that the second harmonic drive 730 comprises the second external gear 731, the second wave gear 732, the connecting sprocket 740 and the flexible gear 750 having the second internal teeth 752.

Accordingly, the harmonic drive 700 according to the seventh embodiment of the invention can generate a double harmonic into which a first harmonic motion by means of the first harmonic drive 720 and a second harmonic motion by means of the second harmonic drive 730 are overlapped.

Firstly, a description is given with respect to the first harmonic motion by means of the first harmonic drive 720. It is assumed that the first harmonic drive is separated from the second harmonic drive. When the first external gear 721 is fixed and the connecting sprocket 740 is rotated in one direction, the flexible gear 750 is rotated in the rotating direction of the connecting sprocket 740 by a difference in the number of teeth between the first external teeth 723 of the first external gear 721 and the first internal teeth 751 of the flexible gear 750.

Next, a description is given with respect to the second harmonic motion by means of the second harmonic drive 730. It is also assumed that the second harmonic drive is separated from the first harmonic drive. When the second external gear 731 is fixed and the connecting sprocket 740 is rotated in one direction, the flexible gear 750 is rotated in the rotating direction of the connecting sprocket 740 by a difference in the number of teeth between the second external teeth 733 of the second external gear 731 and the second internal teeth 752 of the flexible gear 750.

Here, the first external gear 721 and the second external gear 731 have the same pitch diameters but different number of teeth by using profile shifted gears, and therefore the first harmonic motion and the second harmonic motion which is generated by the rotation of the connecting sprocket 740 differs from each other. Further, the first harmonic drive 720 and the second harmonic drive 730 are not separated from each other as in the above assumption but connected to each other via the flexible gear 750, whereby the first harmonic motion and the second harmonic motion are overlapped. Accordingly, a double harmonic motion occurs by a difference between the first harmonic motion and the second harmonic motion.

For example, in the harmonic drive 700 according to the seventh embodiment of the invention, when the first external gear 721 is fixed and the connecting sprocket 740 is rotated, the freely rotatable second external gear 731 rotates by a difference between the first harmonic motion of the first harmonic drive 720 and the second harmonic motion of the second harmonic drive 730. When the second external gear 731 is used as an output, a reduction in velocity can be attained due to the double harmonic.

Further, the flexible gear, the connecting sprocket, the internal and external gears, etc. can be easily manufactured through a molding process. When they are manufactured by the molding method, rubber, plastic or metal powder can be used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention enables a double harmonic motion to be realized by the harmonic drives using profile shifted gears.

The invention claimed is:

1. A harmonic drive using profile shifted gears, comprising:
   a plurality of internal gears;
   a band-typed flexible gear provided with a plurality of teeth engaged with each of the internal gears on its outer circumferential surface, the flexible gear having a pitch circumference length shorter than that of each of the internal gears; and
   a wave generating part disposed on an inner side of said flexible gear, the wave generating part generating a plurality of harmonic motions by deforming said flexible gear as the wave generating part rotates;
   wherein said flexible gear is formed integrally to engage with said plurality of internal gears so that the plurality of harmonic motions are overlapped, and wherein the plurality of teeth of the flexible gear comprise at least first external teeth formed of profile shifted teeth configured to engage with a first internal gear and second external teeth formed of standard teeth configured to engage with a second internal gear, the first external teeth and the second external teeth having the same pitch circumference length.

2. The harmonic drive using profile shifted gears according to claim 1, wherein one or more of said plurality of internal gears are formed of profile shifted gears having profile shifted teeth.

3. The harmonic drive using profile shifted gears according to claim 1, wherein said plurality of internal gears are formed of standard gears having standard teeth of the same pitch diameters respectively.

4. The harmonic drive using profile shifted gears according to claim 1, wherein the teeth of said plurality of internal gears are all formed of profile shifted teeth.

5. A harmonic drive using profile shifted gears, comprising:
   a plurality of external gears arranged coaxially and in parallel to one another;
   a band-typed flexible gear having on its inner circumferential surface teeth which engage with said plurality of the external gears respectively, said flexible gear having a pitch circumference length longer than that of each of the external gears; and
   a wave generating part enabling said external gears and said flexible gear to engage with one another, as the wave generating part partially presses an outer circumferential surface of said flexible gear and rotates;
   wherein the teeth of the flexible gear comprise at least first internal teeth formed of profile shifted teeth configured to engage with a first external gear and second internal teeth formed of standard teeth configured to engage with a second external gear, the first internal teeth and the second internal teeth having the same pitch circumference length.

6. The harmonic drive using profile shifted gears according to claim 5, wherein one or more of said plurality of external gears are formed of profile shifted gears having profile shifted teeth.

7. The harmonic drive using profile shifted gears according to claim 5, wherein said plurality of external gears are standard gears each having standard teeth of the same pitch diameters.

8. The harmonic drive using profile shifted gears according to claim 5, wherein the teeth of said plurality of external gears are all formed of profile shifted teeth.

9. The harmonic drive using profile shifted gears according to claim 5, wherein said wave generating part comprises, a plurality of needle rollers rolling on the outer circumferential surface of said flexible gear and rotating; connecting sprockets disposed on both sides of said external gears, the connecting sprockets connected to said needle rollers; and weight balances for balanced rotation arranged at opposite sides of said needle rollers.

10. The harmonic drive using profile shifted gears according to claim 5, wherein said wave generating part comprises a plurality of balls rolling on the outer circumferential surface of said flexible gear and rotating; a housing part having on its inner circumferential surface a groove in which said balls are restrained; connecting sprockets disposed on both sides of said external gears, the connecting sprockets connected to said housing part; and weight balances for balanced rotation arranged at opposite sides of said housing part.

11. The harmonic drive using profile shifted gears according to claim 5, wherein said wave generating part comprises a surface contacting part pressing the outer circumferential surface of said flexible gear and sliding; connecting sprockets disposed on both sides of said external gears, the connecting sprockets connected to said surface contacting part; and weight balances for balanced rotation arranged at opposite sides of said surface contacting part.

12. A harmonic drive using profile shifted gears, comprising:
   a plurality of external gears arranged coaxially and in parallel to one another;
   a band-typed flexible gear having on its inner circumferential surface teeth which engage with said plurality of the external gears respectively, said flexible gear having a pitch circumference length longer than that of each of the external gears; and
   a wave generating part enabling said external gears and said flexible gear to engage with one another, as the wave generating part is disposed on the inner side of the flexible gear, is spaced apart from said external gears and rotates,
   wherein the teeth of the flexible gear comprise at least first internal teeth formed of profile shifted teeth configured to engage with a first external gear and second internal teeth formed of standard teeth configured to engage with a second external gear, the first internal teeth and the second internal teeth having the same pitch circumference length.

13. The harmonic drive using profile shifted gears according to claim 12, wherein one or more of said plurality of external gears are formed of profile shifted gears having profile shifted teeth.

14. The harmonic drive using profile shifted gears according to claim 12, wherein said plurality of external gears each is a standard gear having standard teeth of the same pitch diameters.

15. The harmonic drive using profile shifted gears according to claim 12, wherein the teeth of said plurality of external gears are all formed of profile shifted teeth.

* * * * *